United States Patent [19]

Fariel et al.

[11] 4,271,206

[45] Jun. 2, 1981

[54] GASIFIED CANDY HAVING A PREDETERMINED SHAPE

[75] Inventors: Harry F. Fariel, Suffern, N.Y.; Marvin J. Rudolph, Bethel; Richard B. Hynson, New Fairfeild, both of Conn.; Pradip K. Roy, Yorktown; Fredric Kleiner, New City, both of N.Y.

[73] Assignee: General Foods Corporation, White Plains, N.Y.

[21] Appl. No.: 88,720

[22] Filed: Oct. 26, 1979

[51] Int. Cl.³ .............................................. A23G 3/00
[52] U.S. Cl. ................... 426/572; 426/660; 426/512; 426/515; 426/474
[58] Field of Search .............. 426/572, 474, 470, 660, 426/302, 103, 512, 515

[56] References Cited

U.S. PATENT DOCUMENTS

| | | | |
|---|---|---|---|
| 2,082,313 | 6/1937 | Todd | 426/474 |
| 2,197,919 | 4/1940 | Bowman | 426/474 |
| 2,784,096 | 3/1957 | Ciccone | 426/474 |
| 3,012,893 | 12/1961 | Kremzner | 426/470 |
| 4,001,457 | 1/1977 | Hegadorn | 426/474 |

*Primary Examiner*—Jeanette M. Hunter
*Attorney, Agent, or Firm*—Daniel J. Donovan; Bruno P. Struzzi; Thomas R. Savoie

[57] ABSTRACT

Uniformly shaped pieces of gasified candy containing gas bubbles having a diameter below 150 microns produce a prolonged sizzling sensation when permitted to dissolve in the mouth. This confection is prepared by injection molding or deposit molding quantities of a gasified sugary melt under superatmospheric pressure.

11 Claims, No Drawings

GASIFIED CANDY HAVING A PREDETERMINED SHAPE

BACKGROUND OF THE INVENTION

1. Field of the Invention

This invention relates to a confection composition. More particularly, it relates to a gasified candy confection prepared with a predetermined geometry. This invention especially relates to discrete pieces of gasified candy having a controlled shape.

2. Description of the Prior Art

Gasified candy is a hard candy containing carbon dioxide gas as disclosed in U.S. Pat. Nos. 3,102,893 of Kremzner and Mitchell, 3,985,909 and 3,985,910 of Kirkpatrick and 4,001,457 of Hegadorn, which are incorporated herein by reference. Such a candy is made by the process which comprises melting crystalline sugar, contacting such sugar with gas at a pressure of 50 to 1,000 psig for a time sufficient to permit incorporation in said sugar of 0.5 to 15 ml. of gas per gram of sugar, maintaining the temperature of said sugar during said adsorption above the solidification temperature of the melted sugar, and cooling said sugar under pressure to produce a solid amorphous sugar containing the gas. Upon the release of the pressure, the solid gasified candy fractures into granules of assorted sizes.

The resultant product contains 1% to 4% water and most typically 2% and 3% water by weight of the total composition. (All percentage figures herein are in terms of weight percent unless expressly stated otherwise.) Lower levels of moisture are not practicably obtainable because the additional heat necessary to drive off the water causes the candy melt to caramelize or burn, resulting in an off-flavor, undesirable product. Higher moisture levels result in a soft, sticky matrix which rapidly liberates the entrapped gas and is thus not storage stable.

The gasified candy, when placed in the mouth, produces an entertaining but short-lived popping sensation. As the candy is wetted in the mouth the candy melts and the entrapped gas escapes. The tingling effect in the mouth is sensational but short.

When the solidified gasified candy is fractured into granulated pieces by the release of pressure from the preparation vessel, the resultant product is sieved to remove the fines. The larger sized pieces are packaged for commercial use but a commercial use has not been found for the fines of gasified candy. The granulated pieces, which form a commercial product, are irregular, randomed-sized pieces having the appearance of pieces of broken glass or what might be termed sharp-faced pieces of gravel.

The gas is contained within the gasified candy in a series of bubbles which, when prepared by the methods disclosed in U.S. Pat. Nos. 3,012,893; 3,985,909; 3,985,910 and 4,001,457 have a size ranging from 3 to 1000 microns, although more than 50% of the bubbles have a diameter greater than 60 microns. It is the release of the gas from these bubbles which produces the popping sensation when the gasified candy is permitted to melt in the mouth.

It is an object of this invention to provide a gasified candy in predetermined shaped pieces.

It is another object of this invention to prepare gasified candy in a controlled shape by a process which will substantially eliminate or significantly reduce the production of gasified candy fines.

It is a further object of this invention to prepare a gasified candy confection which produces a mouthfeel sensation more prolonged than is obtained with the gasified candy produced heretofore.

SUMMARY OF THE INVENTION

In accordance with the present invention, it has been found that gasified candy can be prepared so as to produce a prolonged sizzling sensation when this candy is permitted to melt in the mouth. More particularly, this invention is directed to a confection which comprises: a discrete piece of a gasified candy having a predetermined shape, said candy having retained therein from 0.25 to 5.0 cc. of gas per gram of candy, said gas being distributed throughout the candy as fine bubbles, a majority of said bubbles having a diameter below 150 microns and said gas being at superatmospheric pressure.

This invention is also directed to a method of preparing this confection which comprises:

(a) preparing a melt of sugar,
(b) gasifying the melt under superatmospheric pressure,
(c) forming the melt into discrete and predetermined shaped pieces under superatmospheric pressure,
(d) solidifying the molded pieces under pressure, and
(e) recovering the solidified pieces, said pieces of gasified candy having retained therein from 0.25 to 5.0 cc. of gas per gram of candy, said gas being distributed throughout the candy as fine bubbles, a majority of said bubbles having a diameter below 150 microns and said gas being at superatmospheric pressure.

DESCRIPTION OF THE PREFERRED EMBODIMENTS

The present invention relates to discrete and uniformly shaped pieces of gasified candy. When a piece of this gasified candy is placed in the mouth, it produces a prolonged sizzling sensation. This pleasant mouthfeel is distinct from the short popping sensation produced by gasified candy produced heretofore, particularly that produced by the methods disclosed in U.S. Pat. Nos. 3,012,893; 3,985,909; 3,985,910 and 4,001,457 wherein following solidification of the gasified candy, it fractures into granulated pieces upon release of the pressure from the preparation vessel. The method employed in this invention to prepare these discrete pieces produces the predetermined shaped gasified candy without the production of fines although some waste occurs in the runners of molds where such is employed in practicing this invention.

Briefly, the confection of the present invention consists of discrete and predetermined shaped pieces having gas trapped therein at superatmospheric pressure in the form of bubbles. Surprisingly, the method employed to practice this invention produces gasified candy with gas bubbles having a narrower bubble size distribution and an average bubble diameter significantly less than that of the gasified candy prepared heretofore. Apparently, it is the smaller sized bubbles of gas which produce the prolonged sizzle rather than the short-lived pop of the gasified candy produced heretofore.

Optionally, a final hard coat of edible shellac or varnish, colored if desired, may be applied to the confection. Alternately, a final coating of sugar, either in hard or powdered form, may be applied to the outer surface of the gasified candy. This sugary coating can be colored if desired. In addition or alternately, a polished waxy coating of, for example, beeswax or carnauba wax may be applied to the outer surface of the discrete piece of confection.

The gasified candy of the instant confection is a hard sugar product having bubbles of gas entrapped therein, and is produced by a procedure which is an improvement over that disclosed in the U.S. patents discussed hereinbefore.

The gasified candy of this invention can be prepared from any of the commercially-available sugars employed in the confectionary industry. THus, such sugars as glucose, fructose, sucrose, lactose, etc. alone or in combination may be employed in practicing the instant invention. A combination of sucrose and lactose provides a preferred product. A mixture of sucrose with corn syrup (containing glucose, maltose, dextrin) is also satisfactory. A mixing of sucrose, lactose and corn syrup in a weight ratio of 52:27:21 is particularly preferred, providing an excellent gasified, hard product particularly characterized by its good gas retention and reduced stickiness on standing. The moisture content of the gasified candy is typically between 1.0 and 4.0%. Preferably, it is between 2.0 and 3.0%.

The gases used to prepare the gasified candy of the present invention may be carbon dioxide, nitrogen or air but carbon dioxide is preferred.

Coloring, flavoring and/or active ingredients may be incorporated in the gasified candy to enhance the eye appeal of the confection and to provide a pleasing taste to complement the sizzling effect of the gasified candy. Commercial colorings are available in a variety of shades for incorporation into foodstuffs and may be employed in this invention. The choice will be dependent on the desired effect and, possibly, the flavoring, if any, to be incorporated into the confection. Flavors such as wintergreen, spearmint, peppermint, birch, anise and such fruit flavors as cherry, lemon-lime, orange, grape, etc. and mixtures thereof and the like may be used satisfactorily with the confection of the present invention and are available commercially. Active ingredients are also available for incorporation in the confection to provide a product useful as a breath freshener. The amount of coloring, flavoring and/or active ingredient used will vary depending on the type used, individual taste preferences, the specific gasified candy employed and other considerations well known to those skilled in the confectionary art.

The method of preparation employed in the present invention produces gasified candy in discrete pieces of predetermined geometry with a significant reduction in the production of undesirable fines. Heretofore, pieces of gasified candy have been produced in the preparation vessel. The sudden release of pressure causes a fracturing of the solidified mass into granulated pieces of candy in varying sizes including a significant amount of gasified candy fines. These granulated pieces are of non-uniform shape having smooth planar surfaces with sharp edges. The gasified candy fines and small particles of gasified candy are separated from the larger pieces by sieving. Although the sieved product has been marketed commercially, the gasified candy fines and the very small particles have not found a commercial outlet to date.

The confection of this invention may be prepared as follows:

The sugar or mixtures of sugars are placed in a closed, heated vessel provided with a mixer. A small quantity of water is added to dissolve the sugar and other additives. Heat is applied to the vessel sufficient to dissolve and melt the sugars. The mixture is then evaporated to produce a melt having 1-4 weight percent, preferably 2-3 weight percent, of water. The required amounts of coloring, flavoring and/or active ingredient are usually added when the desired water content is achieved. The evaporation may be conducted at atmospheric pressure or, preferably, under vacuum of up to 15 inches of mercury. Melt temperatures of between about 280°-320° F. are necessary to reach the desired moisture content. Care must be exercised, of course, to prevent caramelizing the sugary mix.

The sugar melt is gasified by introducing gas, preferably carbon dioxide, at superatmospheric temperature into the closed vessel. Pressures of about 50-500 psig, preferably about 350-450 psig are utilized. While the required amount of gas is being introduced into the closed vessel, the liquid sugary melt is agitated to effect intimate contact between the gas and the melt. Sufficient gas is incorporated into the melt to provide 0.25-5.0 cc. of gas per gram of candy in the final product. The gasification is completed within a fairly short period of time. Usually less than about 10 minutes, normally 2 to 6 minutes, are sufficient. The required amount of mixing may be readily determined by those skilled in the art. For example, using a Parr bomb (a small pressure vessel equipped with a mixer) to prepare about 1,000 grams of melt, mixing speeds of 200-1500 rpm, preferably 500-900 rpm, have been found to be satisfactory.

The gasified melt may then be formed into discrete pieces of predetermined geometry. This is most readily accomplished by molding or depositing the gasified melt to produce uniform pieces of gasified candy. The process must be conducted under pressure so as to retain the gas under superatmospheric pressure within the candy product. The pressure should be that employed in preparing the gasified melt or a pressure somewhat higher than that pressure.

It has been found that this invention may be most readily practiced by employing injection molding procedures similar to those used in the plastics industry or deposit molding techniques used heretofore in the confectionary industry. Regardless of which of these two procedures is employed it must be conducted within a pressurized vessel so as to obtain the desired product, i.e., gasified candy with gas trapped therein under superatmospheric pressure. Further, to minimize the cycle time for the molding process, cooling of the mold should be provided once the mold is filled with gasified melt. Either air or liquid cooling may be provided. The initial temperature of the mold can be important, particularly with injection molding, since at mold temperaures of below about 70° F. the gasified melt often will not completely fill the mold. The temperature of the solidified pieces of gasified candy upon discharge from a mold can effect product quality. Preferably, this temperature should be about 80° F. prior to reducing the pressure. Temperatures of about 90° F. and above are to be avoided since pieces discharged at these temperatures often "balloon" upon discharge. Storage temperatures above 90° F. should also be avoided to prevent "ballooning".

In the injection molding embodiment of this invention, the gasified melt may be transferred by pressure from the preparation vessel to an accumulator from which it is injected into the mold. To achieve the desired bubble size within the final product, injection molding pressures should be about five times the pressure employed in the gasification step. Thus, where a pressure of about 400 psig is used to gasify the melt, an injection pressure of about 2,000 psig should be used to assure that the bubbles in the gasified candy produce the desired sizzling sensation. Preferably, the mold is designed so that a number of individual pieces of gasified candy of the desired shape and size may be prepared from a single filling. Following the injection of the liquid melt into the mold, the mold piece is cooled to solidify the melt and cool the candy to the required temperature and then the individual pieces are ejected from the machine. It is necessary to prepressurize the mold before filling with gasified melt so as to retain the gas within the melt until it solidifies. Ideally, the pressure in the mold should be approximately that employed in preparing the gasified melt. Because of the cooling required to below 90° F. for the gasified candy prior to pressure release, a longer molding cycle time is required when practicing the present invention with injection molding equipment than is required to prepare plastic molded pieces with similar equipment.

The deposit molding embodiment of this invention is also conducted within a pressurized vessel. The pressure ideally should be the same or slightly above that employed to prepare the gasified melt. The usual equipment employed within the pressurized vessel for deposit molding includes a feed hopper, a metering device and a series of molds affixed to a conveyor belt or turret or the like. In addition, it is preferred that a homogenizer or similar device be employed to shear or mechanically sub-divide the gas bubbles in the melt to assure that the bubbles in the final product are of the desired size. The homogenizer can be located upstream of the feed hopper. The individual molds are air or liquid refrigerant-cooled to promote solidification of the gasified melt. The gasified melt is transferred from the preparation vessel through the homogenizer and into the feed hopper within the deposit molding pressure vessel. This hopper contains a metering system which dispenses predetermined quantities of the melt into the individual molds as the conveyor belt carries them past the feed hopper. The molds are fabricated so as to produce the discrete particles of gasified candy in the desired shape and size. After the individual mold is filled, the conveyor belt carries it from underneath the feed apparatus. The mold is then cooled under pressure to solidify the gasified melt. In another embodiment, the hopper apparatus deposits a measured quantity of gasified melt onto the surface of the conveyor where it is cooled to produce a solidified drop of the confection. These pieces are discrete and substantially uniform in shape. After solidification, the cooled individual pieces of gasified candy are mechanically ejected from the mold and passed from the pressurized vessel through a pressure lock system.

The bubbles within the gasified candy of this invention produce a sizzling effect rather than the popping sensation obtained from the gasified candy prepared heretofore. The prior art gasified candy, which produces the popping sensation, contains a significant number of bubbles having a diameter greater than 150 microns. A majority of the bubbles in the confection of the present invention have a diameter below 15 microns which is the reason why a sizzling effect is produced. In one particularly preferred embodiment, shearing or mechanically sub-dividing the bubbles in the gasified melt by means of a homogenizer or similar device before it is introduced into the molds produces a gasified candy where more than 50% of the bubbles have a diameter of less than 60 microns, preferably 10–60 microns and more preferably 20–55 microns.

The confection of this invention may be prepared in any predetermined geometry by employing molds of the desired shape and size. The discrete pieces produced may be clear or translucent or opaque depending upon the sugars, gases, additives and process conditions employed. It has been found that increasing the pressure during solidification reduces the bubble size and achieves an improved translucency.

The discrete pieces of gasified candy of the present invention can serve as the finished product and thus may pass from the molding equipment directly to packaging. Optionally, final coatings of a variety of types may be applied to the gasified candy. These coatings improve the storage stability of the product, improve mechanical stability and appearance. For example, a hard coat of edible shellac or varnish, colored if desired, can be applied to the confection. In another embodiment a shiny, hard sugared coating may be applied by a procedure known in the confectionary industry as "pan coating" where the coating is applied and polished. In another embodiment a dry coating of sugar may be applied by a coating machine known as a "dry coater". Again, a polished coating of edible beeswax of carnauba wax may be applied by procedures well known in the confectionary art.

The gasified candy of this invention may be packaged by wrapping the individual pieces and combining a number of these wrapped pieces in an outer wrapping or alternately, a number of the individual pieces may be stacked and wrapped together in a package. Any of the packaging procedures well known in the confectionary art may be employed to produce the gasified candy of this invention in packaged form.

The confection of this invention provides the candy lover with a pleasing organoleptic effect. By permitting the confection to dissolve in the mouth, a sustained sizzling is produced as the melting sugar gradually releases the entrapped gas. Surprisingly, this tingling or sizzling effect is significantly more prolonged than the popping sensation produced by the gasified candy prepared by prior art techniques.

What is claimed is:

1. A method of preparing a confection of discrete and uniform predetermined shaped pieces of gasified, hard candy which comprises:
   (a) preparing a melt of sugar between about 280°–320° F.,
   (b) gasifying the melt under superatmospheric pressure of 35–500 psig, while the melt is uniformly agitated,
   (c) forming the melt into discrete and predetermined shaped pieces under superatmospheric pressure,
   (d) solidifying the pieces under superatmospheric pressure so as to retain the gas under superatmospheric pressure within the pieces, and
   (e) recovering the solidified predetermined shaped pieces, said pieces of gasified candy having a uniform shape and having retained therein from 0.25 to 5.0 cc of gas per gram of candy, said gas being distributed through the candy as fine bubbles, more than 50% of said bubbles having a diameter below 60 microns and said gas being at superatmospheric pressure, said uniform pieces giving a prolonged sizzling sensation when permitted to dissolve in the mouth.

2. A method according to claim 1 wherein the sugar of step (a) is selected from the group consisting of glucose, fructose, sucrose, lactose, corn syrup and mixtures thereof.

3. A method according to claim 1 wherein the pieces of step (c) are formed in a mold.

4. A method according to claim 1 wherein the gas employed in step (b) is selected from the group consisting of carbon dioxide, nitrogen and air.

5. A method according to claim 1 wherein the gas employed in step (b) is carbon dioxide.

6. A method according to claim 1 wherein the gas employed in step (b) is nitrogen.

7. A method according to claim 1 wherein step (c) is performed by injection molding at an injection pressure about five times that of the pressure of step (b).

8. A method according to claim 1 wherein step (c) is conducted by sub-dividing the bubbles in the gasified sugar melt and depositing the gasified sugar melt into individual sections of an open mold under pressure.

9. A method according to claim 1 wherein the solidifying step (d) is conducted under pressure and is performed by liquid or gas cooling of the mold.

10. A method according to claim 1 wherein the gasified candy additionally contains coloring, flavoring or active ingredients.

11. The product of the method of claim 1.

* * * * *

UNITED STATES PATENT AND TRADEMARK OFFICE
CERTIFICATE OF CORRECTION

PATENT NO. : 4,271,206
DATED : June 2, 1981
INVENTOR(S) : Harry F. Fariel et al.

It is certified that error appears in the above-identified patent and that said Letters Patent are hereby corrected as shown below:

In column 1, line 15, change "3,102,893" to -- 3,012,893 -- .

In column 5, line 67, change "15" to -- 150 -- .

Signed and Sealed this

Thirtieth Day of March 1982

[SEAL]

Attest:

*Attesting Officer*

GERALD J. MOSSINGHOFF

*Commissioner of Patents and Trademarks*